(12) United States Patent
Varin et al.

(10) Patent No.: US 9,387,632 B2
(45) Date of Patent: Jul. 12, 2016

(54) METHOD AND DEVICE FOR MANUFACTURING A CYLINDRICAL PART FROM COMPOSITE MATERIAL

(75) Inventors: Franck Bernard Leon Varin, Voulangis (FR); Thierry Godon, Sevran (FR)

(73) Assignee: SNECMA, Paris (FR)

( * ) Notice: Subject to any disclaimer, the term of this patent is extended or adjusted under 35 U.S.C. 154(b) by 152 days.

(21) Appl. No.: 14/342,398

(22) PCT Filed: Sep. 5, 2012

(86) PCT No.: PCT/FR2012/051988
§ 371 (c)(1),
(2), (4) Date: Mar. 3, 2014

(87) PCT Pub. No.: WO2013/034852
PCT Pub. Date: Mar. 14, 2013

(65) Prior Publication Data
US 2014/0217652 A1   Aug. 7, 2014

(30) Foreign Application Priority Data

Sep. 5, 2011   (FR) ..................................... 11 57858

(51) Int. Cl.
| | |
|---|---|
| *B29C 70/68* | (2006.01) |
| *B29C 70/46* | (2006.01) |
| *B29C 70/48* | (2006.01) |
| *B29C 70/54* | (2006.01) |
| *B29C 33/10* | (2006.01) |
| *F01D 21/04* | (2006.01) |
| *F01D 5/28* | (2006.01) |
| *F01D 25/24* | (2006.01) |
| *B29L 31/30* | (2006.01) |

(52) U.S. Cl.
CPC ............... *B29C 70/681* (2013.01); *B29C 33/10* (2013.01); *B29C 70/462* (2013.01); *B29C 70/48* (2013.01); *B29C 70/548* (2013.01); *F01D 5/282* (2013.01); *F01D 21/045* (2013.01); *F01D 25/24* (2013.01); *B29L 2031/3097* (2013.01); *Y02T 50/672* (2013.01)

(58) Field of Classification Search
None
See application file for complete search history.

(56) References Cited

U.S. PATENT DOCUMENTS

2008/0163976 A1   7/2008   Lalande et al.

FOREIGN PATENT DOCUMENTS

| EP | 1 134 069 | 9/2001 |
|---|---|---|
| EP | 1 932 653 | 6/2008 |

OTHER PUBLICATIONS

International Search Report Issued Dec. 4, 2012 in PCT/FR12/051988 Filed Sep. 5, 2012.

*Primary Examiner* — Monica Huson
(74) *Attorney, Agent, or Firm* — Oblon, McClelland, Maier & Neustadt, L.L.P.

(57) ABSTRACT

A method for manufacturing a cylindrical part from composite material, and a molding device to implement the method, the method including: installation of a fibrous structure on a horizontal mandrel; formation of an annular enclosure for molding around the fibrous structure and the mandrel; supply of the enclosure with resin via a first axial end, while keeping a second axial end of the enclosure at a pressure lower than a supply pressure of the resin. The second end includes at least two sectors of vents in a form of ring sectors, each being independently kept at a pressure lower than the supply pressure.

9 Claims, 2 Drawing Sheets

METHOD AND DEVICE FOR MANUFACTURING A CYLINDRICAL PART FROM COMPOSITE MATERIAL

FIELD OF THE INVENTION

The present invention relates to the manufacture of a cylindrical—in particular axisymmetric—part made of composite material, comprising a fibrous reinforcing structure embedded in a matrix of polymerized organic resin.

PRIOR ART

One way of manufacturing parts made of composite material consists, first of all, in producing a preform of the part with fibers oriented in one or more directions depending on the desired mechanical strength. The fibrous structure is then integrated into a closed molding enclosure so as to impregnate it with a synthetic resin which is injected under pressure into the mold in the fluid state. The resin is then polymerized. This technique is known as resin transfer molding (RTM). Introduction of the resin and elimination of interstitial gas between the fibers in the mold can be assisted by reducing the pressure on that side of the mold opposite the injection side.

It is known to produce, using this method, cylindrical parts such as fan casings for jet engines. A casing 1 is shown in FIG. 1. It consists of a single part of axisymmetric shape having a cylindrical portion 1C of non-uniform thickness from one end to the other, in particular having a region of increased thickness in line with the region swept by the blades of the fan in order to absorb the impact energy in the event of a blade failure. This cylindrical portion is bounded by two radial outer flanges 2B and 2D. The upstream and downstream elements of the nacelle of the fan of the engine are attached to the casing by means of these flanges.

Manufacturing this part, in particular, involves producing the preform by rolling an appropriate fibrous structure around a cylindrical mandrel terminated by radial flanks for forming the flanges. The fibrous structure may be formed, for example, by three-dimensional weaving with varying thickness as described in the applicant's patent EP 1961923. The tubular fibrous preform thus forms a single part which may, for a casing, have reinforcing portions corresponding to the flanges.

Mold elements are then arranged on the preform and cover it so as to enclose it in an enclosure. The preform may be placed in radial compression so as to reduce the swelling of the fibrous structure. The enclosure comprises, at one axial end of the cylindrical portion, at one flange, a means for supplying the resin with one or more resin injection openings distributed along the edge of the enclosure about the axis of the cylinder. Distribution ducts may be associated with these injectors. At the other end, also at the flange, an annular cavity is created in the continuation of the preform, having vent openings for establishing a communication with a vacuum source.

In order to ensure balanced filling of the mold enclosure and even rising of the resin all along the periphery of the molding enclosure, after producing the preform and closing the mold, it is commonplace to arrange the latter vertically with the resin injection means in the lower portion and the annular vent duct on the upper portion. In this manner, the resin penetrates into the enclosure along the preform, forming the flange located in the lower portion thereof; the resin front then rises gradually and uniformly until it reaches the upper flange which is in communication with the vent duct.

This method for injecting the resin gives very good results in terms of speed and evenness of filling of the mold enclosure.

However, the following problem arises: on one hand, putting in place the tubular preform by winding the fibrous structure onto the inner mandrel and assembling the mold are steps which are carried out when the part is in a horizontal position and, on the other hand, the fan casings of medium- and high-power jet engines are large, having a diameter of for example at least two meters. It follows that handling the mold, which can weigh between 5 and 25 tonnes, is a very delicate operation involving HSE (health, safety and environmental) risks to the operators and which, moreover, requires costly tooling to be put in place.

One solution would therefore be to keep the mold horizontal during the mold filling phase. Tests performed have unfortunately shown an unsatisfactory distribution of the resin, as shown in FIG. 2. The mold 4 comprises a molding enclosure inside which the fibrous preform is kept compressed. The mold comprises an annular central section 40 between two coaxial cylindrical walls. A first end 41 of the enclosure, formed so as to create a radial flange, comprises resin supply means in the form of injectors 41a, 41b, etc. which are distributed over the perimeter of the first end 41. The second end 42, opposite the first, is also formed so as to create a radial flange. An annular vent duct 42e is open along the second end. The injection means 41a, 41b, ... are in communication with a source of fluid resin under pressure (not shown) and the vent duct 42e is in communication with a vacuum source. The three diagrams of the figure show three stages in filling the enclosure, with impregnation of the preform contained therein. The resin R is represented by hatched areas. The fluid R is distributed all along the supply end 41 but, due to gravity, the lower portion of the fibrous preform in the enclosure 40 is completely impregnated before the upper portion. As it progresses, shown in the middle diagram, the fluid R then rises along the vent duct 42e at the opposite end 42. Tests showed, as seen in the right-hand diagram, that at least one region P', in the upper portion of the preform close to the vent duct 42e, was impregnated badly or to a limited extent. Indeed, in the upper portion of the mold, when in the horizontal position, it is difficult for the resin front to reach the vent duct 42e as the vent duct is filled by the resin from the lower portion before the front in the upper portion reaches it. Bad impregnation leads to weaker and unacceptable mechanical properties in the region in question.

OBJECT OF THE INVENTION

The present applicant has thus set itself the object of keeping the mold in a horizontal position, without pivoting it vertically through 90°, while improving the filling thereof.

This object is achieved, in accordance with the invention, with a method for manufacturing a cylindrical part from composite material, comprising the following steps:
  putting in place a fibrous structure on a horizontal mandrel,
  forming an annular molding enclosure around the fibrous structure and the mandrel,
  supplying resin to the enclosure via a first axial end while keeping the second axial end of the enclosure at a pressure below the resin supply pressure, the molding enclosure being kept in a horizontal or substantially horizontal position, wherein this method is characterized in that the second end comprises at least two vent sectors in the form of ring sectors, each independently kept at a pressure below said supply pressure.

By dividing the vent duct into sectors it is possible to control, independently, the filling of the enclosure in those regions in line with their respective vent sectors. This filling control makes it possible to reproduce the even distribution of the fluid in the fibrous preform which is known in the case of a mold in the vertical position.

Advantageously, the distribution of the fluid during filling is controlled even better by supplying the enclosure with resin by at least two injectors distributed over the perimeter of the first axial end. In this case, preferably, said vent sectors of the second end are each arranged in the continuation of an injector of the first end. More particularly, centering the vent sectors opposite the injection points, ensures that the resin is drawn through the preform in a more uniform manner.

The invention also relates to a molding device for implementing the method for manufacturing a cylindrical part, wherein one end wall of the molding enclosure is provided with at least one vent duct, characterized in that said vent duct is formed by at least two independent ring sectors. More particularly, the vent duct is annular, with at least two ring sectors separated by transverse partitions.

This embodiment is particularly simple to implement and requires no substantial modification of the molding installation.

The invention relates in particular to the production of a cylindrical part such as a casing for a turbomachine having at least one flange at one axial end, said end wall forming the flange.

In this application, the ring sector forming a vent can be created either on that radial portion which is upstream of said wall forming the flange, or on that radial portion which is downstream of said wall forming the flange, or even on the longitudinal portion of the wall forming the flange. The vent can also be formed of a combination of these ring sectors.

In one preferred embodiment, the molding device comprises at the first end at least two resin injectors, each of said ring sectors forming vents being arranged in the continuation of an injector and centered thereon.

PRESENTATION OF THE FIGURES

The invention will be better understood and other aims, details, features and advantages of the invention will become clearer in the following detailed explanatory description of a purely illustrative and non-limiting exemplary embodiment of the invention, with reference to the appended schematic drawings, in which.

DETAILED DESCRIPTION OF AN EMBODIMENT OF THE INVENTION

Figure 1:
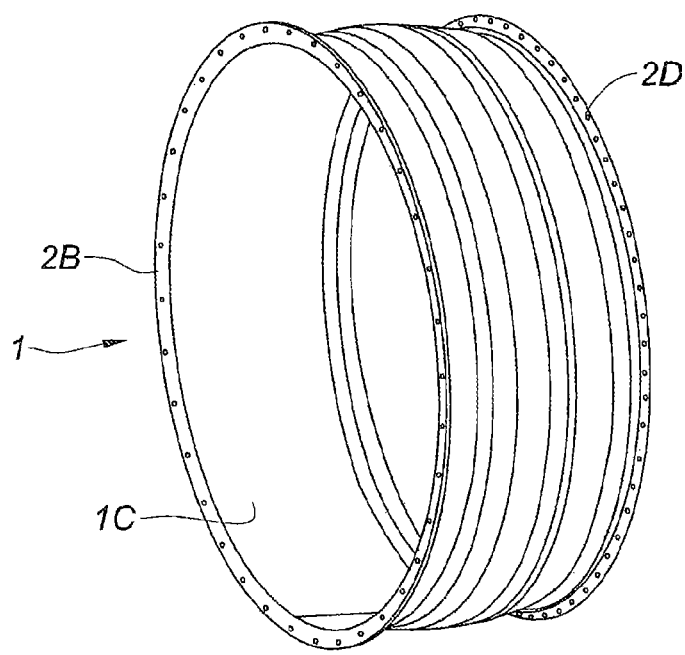
FIG. 1 shows, in perspective, an example of a jet engine fan casing.
Figure 2:
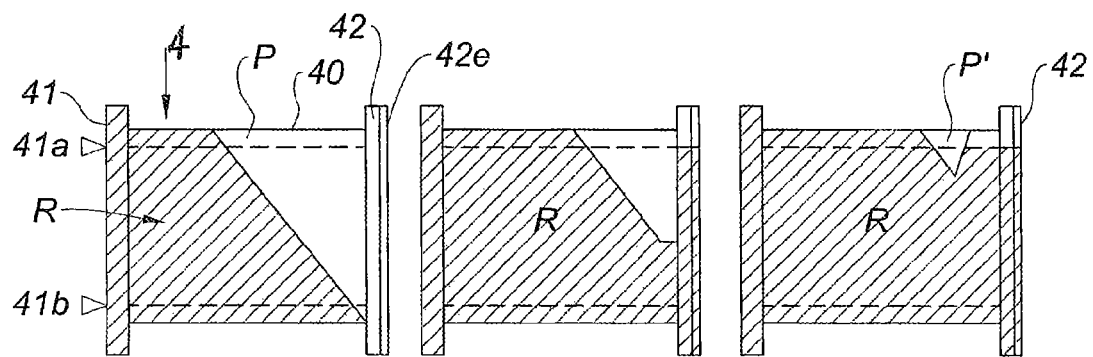
FIG. 2 shows, schematically in three stages, the progression of the filling of an enclosure for molding a cylindrical part arranged horizontally, without the method of the invention.
Figures 3, 4:
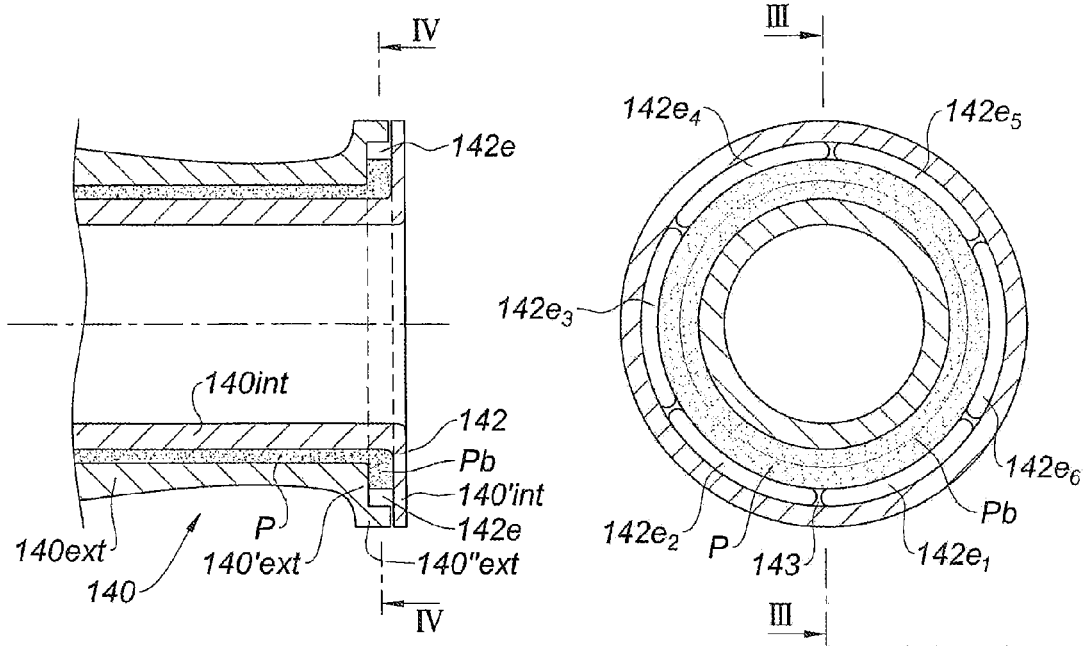
FIG. 3 shows, in axial section through in FIG. 4, an embodiment of the second end of the molding device, having a vent duct arrangement according to the invention.
FIG. 4 shows, in transverse section through IV-IV in FIG. 3, the second end of the molding device.

With reference to FIGS. 3 and 4, which are partial views of a molding device 140 according to the invention, the preform P is shown compressed inside interior 140int and exterior 140ext cylindrical walls. The preform is a fibrous structure which has been put in place beforehand on the mandrel forming the interior wall 140int.

The fibrous structure can be of the unidirectional (1D) type, for example formed by winding a thread or cable, of the two-dimensional (2D) type, for example formed by wrapping fibrous layers, or of the three-dimensional (3D) type, for example formed by 3D weaving, braiding or knitting or by superposing fibrous layers and connecting them to one another.

In this last case, the fibrous layers can be connected to one another mechanically by elements extending through the layers. This can be effected by needle bonding with displacement of fibers out of the plane of the layers, by pushing threads or rigid elements (needles or rods) through the layers, or by stitching. One example of a fibrous structure is described in patent application EP 1961923.

In this FIG. 3, the second end 142 of the side of the vent duct comprises a radial space created between the radial end walls of the mold elements 140'int and 140'ext. In this space there is the radial portion Pb forming the flange of the preform P. The preform does not entirely fill this radial space. A vent duct for reducing the pressure in the enclosure is created between the preform Pb and the walls of the tooling. This vent duct is, in accordance with the invention, subdivided into several vent sectors, in this case, as an example, six sectors 142 e1 to e6, which are separated by radial partitions 143. The partitions may be produced in various ways.

According to one embodiment, a plurality of arcuate grooves is machined into the tooling over the perimeter of the end region 142 in the longitudinal portion 140"ext of the wall forming the flange.

According to another embodiment, a continuous annular groove is machined into the tooling and separation means forming partitions, such as blocks or foam, are introduced into the groove.

These vent sectors are shown in FIG. 4. The vent sectors are thus isolated from one another and each communicate independently with the entrance of one or more suction pumps which are at a lower pressure than the resin source at the other end of the mold. At this other end (not shown), a plurality of resin injectors (not shown) is arranged around the perimeter of the mold.

The vent sectors in the form of ring sectors can also be produced on the upstream radial portion 140'ext of the wall of the tooling forming the flange, or also on the downstream radial portion 140'int of said wall.

It is also possible for the vent sectors not to be created in a single wall but to alternate from one side to the other.

The injection of the resin is preferably effected by a number of injectors identical to the number of vent sectors. Moreover, each sector is located in the continuation of an injection point, being centered opposite the latter so as to allow the resin to be drawn through the preform as uniformly as possible.

The device is filled as follows. Once the preform has been put in place, the molding enclosure has been closed and, if appropriate, the preform has been compressed by bringing the exterior elements of the mold closer in the radial direction to the interior elements, the resin is introduced under pressure simultaneously via the collection of injection points located at the first end. At the same time, the various vent sectors are kept at reduced pressure. The effect of the reduced pressure on each of the sectors, independently of the others, makes it possible to compensate for the effect of gravity on the resin progression front.

Figure 5:
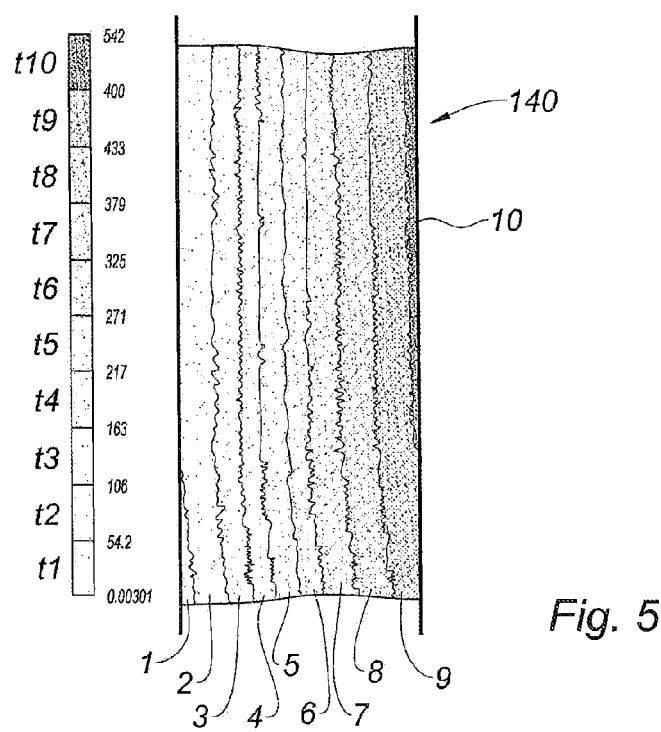
FIG. 5 is a diagram showing the progress of the resin front during filling of the molding enclosure and impregnation of the preform.

FIG. 5 shows an example of the progress, with respect to time, of the resin front along the fibrous structure between the first injection end and the second end having the vent sectors. For a duration of 542 s corresponding to the filling, the shape of the front at instants t1 to t10, between the start of the injection and the end of the filling, has been determined by simulation. It can be seen that the resin front progresses evenly, remaining substantially perpendicular to the axis of the tooling.

The invention claimed is:

1. A method for manufacturing a cylindrical part from composite material, comprising:
   a) putting in place a fibrous structure on a horizontal mandrel;
   b) forming an annular molding enclosure around the fibrous structure and the mandrel;
   c) supplying resin to the enclosure via a first axial end while keeping a second axial end of the enclosure at a pressure below a resin supply pressure, the molding enclosure being kept in a horizontal or substantially horizontal position;
   wherein the second axial end includes a radial space delimited between radial end walls of the mandrel and the enclosure in which a radial portion of the fibrous structure forming a flange of the cylindrical part is disposed, the radial portion of the fibrous structure extends radially outward and does not entirety fill the radial space, and
   wherein at least two vent sectors in a form of ring sectors, each independently kept at a pressure below the resin supply pressure, are provided between the radial portion of the fibrous structure and the radial end walls of the mandrel and the enclosure.

2. The method as claimed in claim 1, herein the enclosure is supplied with resin by at least two injectors distributed over a perimeter of the first axial end.

3. The method as claimed in claim 2, wherein the vent sectors of the second axial end are each arranged in a continuation of an injector of the first axial end.

4. A molding device for implementing the method as claimed in claim 1 for manufacturing a cylindrical part, wherein one end wall of the molding enclosure includes a vent duct, and wherein the vent duct is formed by at least two independent ring sectors.

5. The device as claimed in claim 4, wherein the vent duct is annular, with at least two ring sectors separated by transverse partitions.

6. The molding device as claimed in claim 4, wherein the radial portion is upstream of the radial end wall of the mandrel.

7. The device as claimed in claim 4, wherein the radial portion is downstream of the radial end wall of the enclosure.

8. The device as claimed in claim 4, wherein the vent is defined in part by a longitudinal portion of the radial end wall of the enclosure.

9. The device as claimed in claim 4, comprising at the first axial end at least two resin injectors, each of the ring sectors forming vents being arranged in a continuation of an injector and centered thereon.

* * * * *